United States Patent [19]
Smith

[11] Patent Number: 5,701,511
[45] Date of Patent: Dec. 23, 1997

[54] REDBOOK AUDIO SEQUENCING

[75] Inventor: Matthew W. Smith, Tulsa, Okla.

[73] Assignee: Microsoft Corporation, Redmond, Wash.

[21] Appl. No.: 510,260

[22] Filed: Aug. 2, 1995

[51] Int. Cl.⁶ .................................................. G06F 13/10
[52] U.S. Cl. .................................................. 395/806; 395/807
[58] Field of Search ........................... 395/154, 152, 395/153, 155, 161, 806, 807, 173, 175

[56] References Cited

U.S. PATENT DOCUMENTS

| | | | |
|---|---|---|---|
| 5,440,677 | 8/1995 | Case et al. | 395/154 |
| 5,471,576 | 11/1995 | Yee | 395/154 |
| 5,515,490 | 5/1996 | Buchanan et al. | 395/154 |
| 5,542,023 | 7/1996 | Sakai et al. | 395/154 |

*Primary Examiner*—Heather R. Herndon
*Assistant Examiner*—Sabrina Dickens
*Attorney, Agent, or Firm*—Ronald M. Anderson

[57] ABSTRACT

A method and apparatus for maintaining synchronization and sequencing between an audio track and other components of a multimedia work. The audio track is recorded in accordance with the Redbook standard, enabling the CD-ROM on which the audio is stored to be played on a conventional CD player. In order to synchronize the audio track with other components of a multimedia work, such as video, a separate time/command track is provided on the CD-ROM. This separate time/command track includes timing data which reference a physical address in the audio track and an associated command that is to be implemented when playback of the audio track reaches that physical address. Consequently, video and other components can be maintained in synchronization with the audio track. If synchronization is lost, it can be regained either by immediately executing commands that should have been executed at an earlier point in the playback of the audio track, or by dropping the commands.

35 Claims, 5 Drawing Sheets

REDBOOK AUDIO SEQUENCING

FIELD OF THE INVENTION

The present invention generally relates to a method and system for sequencing one type of data with another type of data, and more particularly, for sequencing data in a specific format, such as the Redbook standard, with another type of data, such as video data.

BACKGROUND OF THE INVENTION

Several different audio data formats, including Redbook, Greenbook, and Yellowbook, are used to define how the sectors on an audio compact disk (CD) are divided when storing the data that represent recorded sound. Of these three formats, the Redbook standard is most often used in connection with the audio data recorded on multimedia CD-ROM (read-only memory).

To access audio data stored on a conventional audio CD, a logical address, which corresponds to a record number or byte offset, is converted to a physical address that specifies a position on the disk. A laser read head or pickup is then positioned to access the audio data stored at that physical address. On a conventional CD-ROM, data are also referenced by accessing an address that includes a track number and a relative timing position specified by a minute, second, and frame. This timing position or address is sometimes referenced by the acronym "TMSF."

In a multimedia work recorded on a CD-ROM, audio tracks are often sequenced with video or other types of data that are played (executed) concurrently. The audio data recorded on a track are streamed from the CD-ROM at a constant rate. Due to the nature of audio signals, it is not practical to interrupt the audio track playback to maintain synchronization with other data executing concurrently. The conventional or prior art approach used for synchronizing audio data with other data is to insert or embed timing marks into the audio data stream recorded on the CD-ROM. These timing marks serve as references for synchronizing other concurrent elements of the multimedia work with the audio track. However, insertion of the timing ticks into the audio data makes the audio track recorded on the CD-ROM unplayable on a conventional audio CD player. A CD-ROM player is connected to a computer that can separate the timing marks from the audio data, but an audio CD player is not designed to carry out this task and can only play audio data recorded in one of the three standard formats noted above. Thus, the audio track on a prior art CD-ROM can be played on a CD-ROM player, but not on a conventional audio CD player.

Conventional audio CDs record sound with substantially greater dynamic range and fidelity than was possible on long playing (LP) vinyl disks. However, multimedia CD-ROMs that include recorded music and other sound recordings can provide a more complete entertainment experience for those who have the appropriate computer system and hardware to access the data stored thereon. Music publishers, becoming aware of the potential of the CD-ROM multimedia format, are now releasing recorded music on both CD-ROM and corresponding audio CD versions. However, the CD-ROM releases also include other material, such as interviews with the artists, lyrics, and video clips showing the artists performing the music. Because the CD-ROM versions are thus much richer in content, they can command a higher price. There is a drawback to purchasing the CD-ROM version, since a multimedia computer is required to play the audio tracks recorded on a conventional CD-ROM.

After initially enjoying the multimedia components of such a release, a typical purchaser will most likely want to be able to just play the audio portion on a conventional CD player, or to play the audio tracks on the CD player of a car or on a portable CD player. Those options are not available with conventional CD-ROMs. Clearly, it would be preferable to record music on the audio tracks of a CD-ROM in a format that can also be played on an audio CD player.

To provide universal access to the audio recorded on a CD-ROM, a new technique must be used for sequencing or synchronizing the other data stored on the CD-ROM with the audio data. Timing marks embedded in the audio data cannot be used for the reasons noted above. An economical solution to this problem does not exist in the prior art. Any solution to this problem must permit other data to be resynchronized with the audio data, if synchronization is lost. The present invention addresses both of these issues.

SUMMARY OF THE INVENTION

In accordance with the present invention, a method is defined for storing a first data stream and a second data stream, enabling their synchronized playback from a storage medium. The method includes the steps of storing the first and the second streams of data on the storage medium. The second stream of data is stored on the storage medium separate from the first stream of data and comprises timing data that specify a plurality of temporal pairs. Each temporal pair includes a command associated with a position in the first stream of data. The temporal pairs are used to sequence the second stream of data with the first stream of data, so that the first and the second streams of data are synchronized.

Preferably, the first stream of data defines an audio signal, and the second stream of data controls non-audio elements of a multimedia work that are to be executed in synchronization with the audio signal. In addition, the storage medium preferably comprises a CD-ROM. The first stream of data is formatted on the CD-ROM so that the data are playable on a conventional audio CD player. Each position within the first data stream is specified by a track, a time, and a frame.

The method also includes the step of resynchronizing the second stream of data with the first stream of data if synchronization is lost. One method of resynchronizing comprises the step of skipping the commands in any temporal pairs that reference previous positions in the first stream of data stream, where the previous positions in the first stream of data have already been executed by the computer. Another method of resynchronizing comprises the step of immediately executing the commands in any temporal pairs that reference previous positions in the first stream of data, where the previous positions in the first stream of data have already been executed by the computer. Thus, the commands associated with the previous positions are immediately executed by the computer without regard for timing of the commands. Another step provides for enabling a user to select the method used to resynchronize the first and the second streams of data.

For the preferred application, the first stream of data comprises audio data, including either Redbook data, MIDI data, or WAV data.

Another step of the preferred embodiment is that of comparing the position in the second data stream to that in the first data stream at predefined time intervals. The time intervals are determined by a timer running on the computer.

A further aspect of the invention is directed to a system for storing a first data stream and a second data stream on a storage medium so that the first and the second data streams are synchronized when read from the storage medium. The system comprises a computer for implementing the storage of the first and the second data streams on the storage medium. The computer includes a central processing unit (CPU), a memory for storing machine instructions used to control the CPU, and an interface to the storage medium. The interface handles transfer of data from the computer to the storage medium for storage therein under control of the CPU.

Means for loading the machine instructions into the memory are another element of the system. The machine instructions cause the CPU to store the first data stream on the storage medium in a defined format. When executing the machine instructions, the CPU provides a plurality of temporal data pairs for the second data stream. Each of the temporal data pairs includes a command and position data that reference a position within the first data stream. The CPU stores the second data stream on the storage medium, separate from the first data stream, so that the commands of the second data stream are synchronized with the first data stream by using the position data, when the first and second data streams are subsequently read from the storage medium.

Other functions implemented by the CPU when executing the machine instructions are generally consistent with the steps of the method discussed above.

Yet a further aspect of the present invention is an article of manufacture that includes a memory medium on which are stored machine instructions that are executable on a computer. These machine instructions provide for implementing substantially the same functions discussed above in connection with the method for storing a first data stream and a second data stream for synchronized playback.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
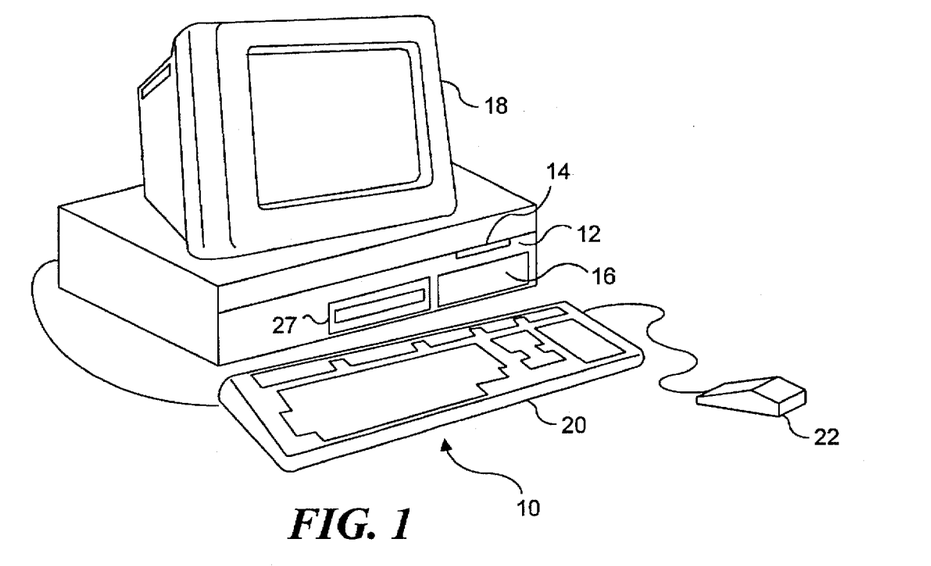
FIG. 1 schematically illustrates a personal computer system of the type used in creating a multimedia work so as to enable synchronization of data streams stored in accordance with the present invention.
Figure 2:
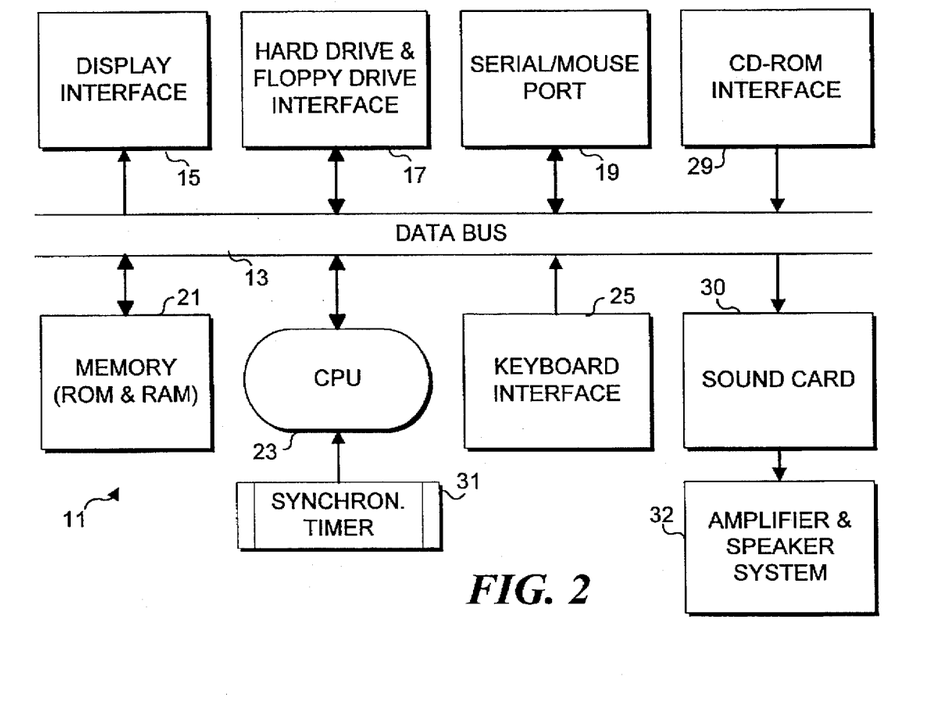
FIG. 2 is a schematic block diagram illustrating the functional components of the personal computer shown in FIG. 1.

With reference to FIG. 1, a personal computer system 10 is illustrated. Personal computer system 10 is suitable for both creating a multimedia work in which the present invention is implemented and in playing back the multimedia work after it has been stored on a CD-ROM. Personal computer system 10 is of the multimedia type, i.e., it has the ability to play audio and video data recorded on a CD-ROM that is inserted into a CD-ROM drive 27, but in all respects is generally conventional in design and in the components comprising it. The personal computer includes a processor chassis 12 in which most of the circuitry required for operation of the personal computer is contained on a mother board (not shown) or on separate circuit boards designed to interface with the mother board by plugging into slots on a data bus 13, as shown in FIG. 2. Since such details are well known to those of ordinary skill in the art, there is no need to disclose them in regard to the present invention.

Included within processor chassis 12 is a floppy disk drive 14 that is suitable for recording and playback of a floppy disk (not shown). A hard drive 16 provides storage for both machine instructions used in executing applications and data used and created when personal computer system 10 is in operation. Sitting atop processor chassis 12 is a monitor 18, which is preferably capable of displaying graphic images with at least 640×480 pixels resolution, at 256 colors, in order to facilitate creation and/or playback of a multimedia work. Input from a user is provided to control applications executing on personal computer 10, both through a keyboard 20 and a mouse 22 (or other conventional pointing device used for manipulating a cursor on monitor 18). Although personal computer 10 is shown as a conventional desktop system, it will be understood that most if not all of the capabilities required for creating and/or playing a multimedia work are now available in a laptop computer system or in a workstation coupled to a local area network or a wide area network.

Further details of the components comprising personal computer 10 and disposed within processor chassis 12 are shown in FIG. 2, with reference to a schematic block diagram 11. A central processing unit (CPU) 23 is coupled to data bus 13 to execute machine instructions that have been loaded into a memory 21 from the hard drive or from other non-volatile storage media, such as a floppy disk. Although not separately shown, memory 21 comprises both read only memory (ROM) and random access memory (RAM). Generally, ROM is non-volatile and is used for storing instructions that control CPU 23 during boot-up of personal computer 10. The RAM portion of memory 21 is loaded with machine instructions comprising an application selected by the user for execution on personal computer 10 and also serves to temporarily store variables and other data.

Also coupled to data bus 13 are a display interface 15, through which video data are input to monitor 18, a hard drive and floppy drive interface circuit 17, which provides bi-directional data flow to floppy drive 14 and hard drive 16, and a serial/mouse port 19 through which mouse 22 or other serial devices communicate with CPU 23. A keyboard interface 25 provides a port for coupling keyboard 20 to data bus 13. Similarly, a CD-ROM interface 29, e.g., a small computer systems interface (SCSI) or other interface card enables machine instructions and data stored on a CD-ROM to be input to data bus 13 and thereby loaded into memory 21 for access by CPU 23. In addition, a sound card 30 is connected to data bus 13 so that sound recorded on a CD-ROM can be transferred through data bus 13 from the disk and played back through an amplifier and speaker system 32, which is coupled to sound card 30. Although typically implemented in software, a synchronous timer 31 is shown as a hardware block that is connected to CPU 23 in FIG. 2. Synchronous timer 31 provides a timing reference for CPU 23 that is used in synchronizing audio data stored on a CD-ROM with other types of data stored on the CD-ROM, as explained below.

In a multimedia work, an audio component can be produced in a variety of forms. By digitizing an audio signal, its corresponding digital form can be stored on a CD-ROM in a wave file (*.WAV) and played back to reproduce the original audio sound. Music is sometimes stored in a multimedia work in the form of musical instrument digital interface (MIDI) data that can be used to drive a synthesizer on sound card 30 or an external synthesizer (not shown). Since the MIDI data stored on the CD-ROM indicate only the parameters of the notes comprising the music, but do not represent the actual sound of the music, the size of a MIDI data file is relatively small compared to a corresponding digitized audio selection. However, the quality of the sound produced using MIDI data to control a synthesizer depends to a large extent upon the quality and type of the synthesizer.

The present invention is directed to a technique for using audio data that has been digitized and recorded on a CD-ROM in a format conforming with the Redbook standard. As noted above in the Background of the Invention, this standard is used on conventional audio CDs, but is normally not used without embedded timing marks to record audio that must be synchronized with other data in a multimedia work recorded on a CD-ROM.

On a conventional audio CD, the digitized sound is recorded in up to 99 tracks. The tracks on the CD are divided into logical sectors that have a fixed length, generally analogous to the sectors used on data storage devices such as hard drive 16. The physical address of each sector in a track is specified in terms of time, i.e., minutes and seconds, and in regard to blocks or frames within each second.

Figure 3:
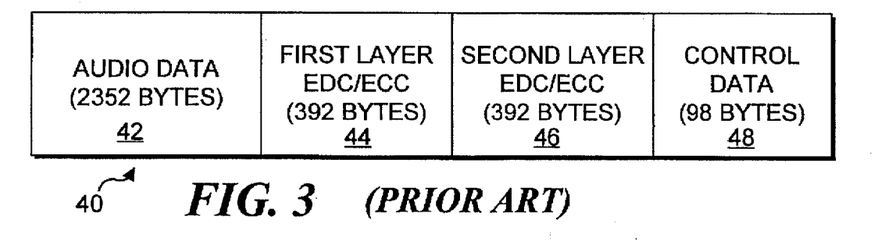
FIG. 3 illustrates the prior art Redbook audio data format for a single sector.

A sector 40 of an audio track conforming to the Redbook standard is shown in FIG. 3 (prior art). Sector 40 includes 2,352 bytes of audio data stored in a block 42. The audio data are followed by two blocks 44 and 46 that include, respectively, first and second layers of error detection code (EDC) and error correction code (ECC). Each of blocks 44 and 46 is 392 bytes in length. In addition, sector 40 includes 98 bytes of control data in a block 48. The control data include timing information that allows the CD player to immediately find the beginning of each audio selection and provides information about the selection, including its number and running time. In addition, the control data also enable the CD player to provide a continuous display of elapsed time as the selection is played, since the relative timing information for the track are recorded therein.

Audio data formatted in accordance with the Redbook standard is sampled at 44.1 kHz, with at least 16 bits of resolution. When playing back an audio selection recorded on a CD, the disk turns at a variable rate depending upon the position of the read head. The CD spins counter-clockwise, at a speed of up to 500 r.p.m. when the read head is at the inner track, close to the center of the disk, and slowing to approximately 200 r.p.m. as the read head moves toward the outer edge of the disk. Thus, the digital data on the disk are read at a constant linear speed of approximately four feet per second or 75 frames per second. When a conventional audio CD is playing in a CD or CD-ROM player, there is no other data to synchronize with the audio data. However, in a multimedia work in which other data are synchronized with the audio data, it is not possible to rely upon CPU 23 to execute the other data in synchronization with the continuously streaming audio data. Since CPU 23 may be called upon to perform higher priority tasks during the execution of a multimedia work, it is quite possible the other data may execute at a slower rate than the audio data are played by the sound card. Consequently, the audio and other portions of the multimedia work can become unsynchronized and out of sequence.

Figure 4:
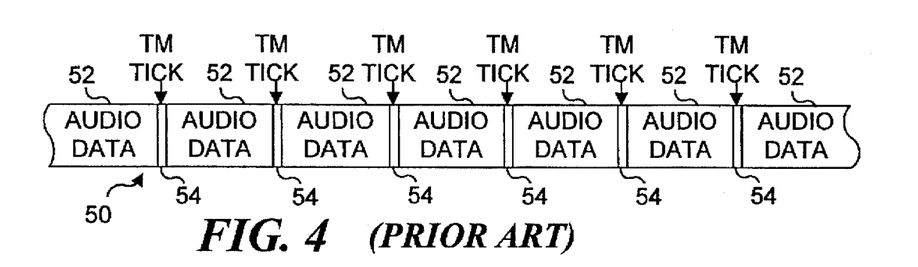
FIG. 4 schematically illustrates the prior art approach used for synchronizing audio data using timing marks embedded in the audio data stream.

To avoid loss of synchronization and sequencing of audio data and other data, the conventional scheme embeds timing mark ticks 54 in the audio data in a track 50, a portion of which is shown in FIG. 4 (prior art). In track 50, blocks of audio data 52 alternate with timing mark ticks 54, thereby enabling CPU 23 to reference the portion of the audio data currently playing so that a corresponding other portion of the multimedia work will execute concurrently. Any loss of synchronization occurs only briefly, since the CPU can immediately resynchronize the other data with the audio data by reference to the time contained in the timing mark tick of the audio data stream. While this prior art technique maintains the audio and other data in synchronization, it makes the audio track on a CD-ROM unplayable on a conventional audio CD, since timing mark ticks 54 can not be stripped from the audio data by a conventional audio CD player.

Figure 5:
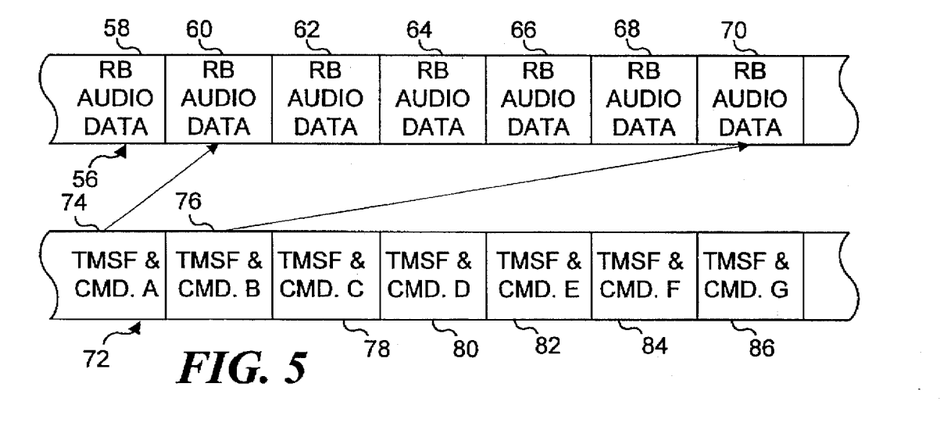
FIG. 5 schematically illustrates how the present invention uses a separate track that contains timing data, for synchronizing commands in the separate track with Redbook audio data stored on a CD-ROM.

In contrast to the prior art approach graphically illustrated in FIG. 4, the present invention uses a technique shown in FIG. 5 to maintain synchronization between audio data recorded in a track 56 in accordance with the Redbook standard and a separate timing and command track 72. Since audio track 56 stores the audio data in the conventional Redbook standard format, as shown in the portion of the track comprising blocks 58 through 70, audio track 56 is readily reproduced when the CD-ROM is placed into a conventional audio CD player. Of course, the other portions of the multimedia work that are not recorded in accordance with the Redbook format standard will not be reproduced by the conventional CD player. Thus, when a user is not interested in experiencing the other portions of the multimedia work or does not have access to a multimedia computer, the audio track portion of the CD-ROM can nonetheless be played on a conventional audio CD player.

As shown in FIG. 5, audio track 56 has exactly the same format as a track on a conventional audio CD, because it conforms to the Redbook standard. Thus, each of the sectors comprising audio track 56, of which only sectors 58 through 70 are shown, has the same blocks as does sector 40 in FIG. 3.

It is also contemplated that the present invention can be used to maintain synchronization with audio data stored in other formats, e.g., wave (.WAV) files and MIDI files, each of which include reference time information. Accordingly, although the greatest advantage of the present invention arises in connection with maintaining synchronization with audio data stored in accord with the Redbook standard format, it can more generally be used for maintaining synchronization between any two streams of data.

In order to maintain synchronization between audio track 56 and other components of the multimedia work that are executed by CPU 23, timing and command track 72, which is recorded on the CD-ROM separate from audio track 56 includes a plurality of timing and command pairs. Thus, a block 74 includes timing information comprising a track number, minute, second, and frame (TMSF) corresponding to a physical address of sector 60 in the audio data stored in the Redbook standard format on track 56. At the time that sector 60 is playing, CPU 23 can compare the timing information contained in the control data block of the sector with the TMSF data in block 74, and since the two match, the CPU will execute a command A in block 74. Command A may provide for a variety of actions, such as initiating an animation sequence, advancing a video, or controlling some other aspect of the multimedia work. Similarly, as noted in a block 76 of the timing and command track 72, when the TMSF corresponds to the physical address of audio sector 70, a command B should be executed. In like manner, each of the remaining timing and command blocks 78 through 86 shown in the portion of timing and command track 72 in FIG. 5 are implemented at appropriate times during the playback of audio track 60, or of some subsequent audio track identified by the TMSF data in each timing and command block.

Figure 6:
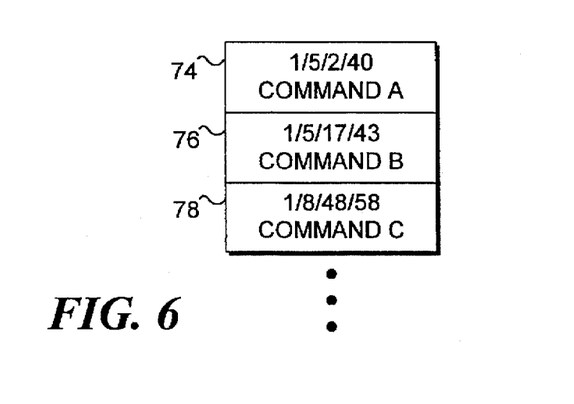
FIG. 6 schematically illustrates several exemplary time and command blocks.

As shown in the example of FIG. 6, the TMSF data at which commands A through C should be executed indicate how three different physical addresses in the audio track are referenced. One example of a simple application requiring synchronization between an audio track and another element of a multimedia work is the provision of a bouncing ball or highlighting of specific words in the text lyrics of a song that is recorded on an audio track. As each successive phrase in the lyric finishes playing from the audio track, a bouncing ball shown in an animated text frame of the multimedia work should progress to the first word of the next phrase. Thus, the commands associated with specific addresses in the audio track simply advance the bouncing ball to the beginning of the next text phrase. Clearly, the bouncing ball must remain in synchronization with the audio track to be effective in enabling a listener to follow the words in the lyric as they are expressed in the music. More complex commands can be implemented in sequence with the audio track playback in the same fashion.

The present invention is currently implemented in a SYMMETRY™ multimedia authoring program or application developed for Microsoft Corporation. This application comprises a software program that includes machine instructions stored on the hard drive, but distributed to multimedia authors on either a CD-ROM, or on floppy disks. When selectively loaded into memory 21, the machine instructions comprising the SYMMETRY program enable an author to assemble and create the components of a multimedia work. These components can include audio data that must be synchronized with other data or commands during execution of the multimedia work. A run-time version of the SYMMETRY program can be included with the multimedia work for distribution to end users, so that the components of the multimedia work execute on a multimedia computer in the same manner as under the full version of SYMMETRY, which includes editing and control capabilities. However, by storing the audio data on the CD-ROM in the Redbook standard format, the audio tracks on the CD-ROM can be played on a conventional CD player, independent of the SYMMETRY program. It is contemplated that the technique for enabling synchronization to be maintained between different data streams in accord with the present invention can also be implemented as a separate software program or application, or incorporated in other applications.

Figure 7:
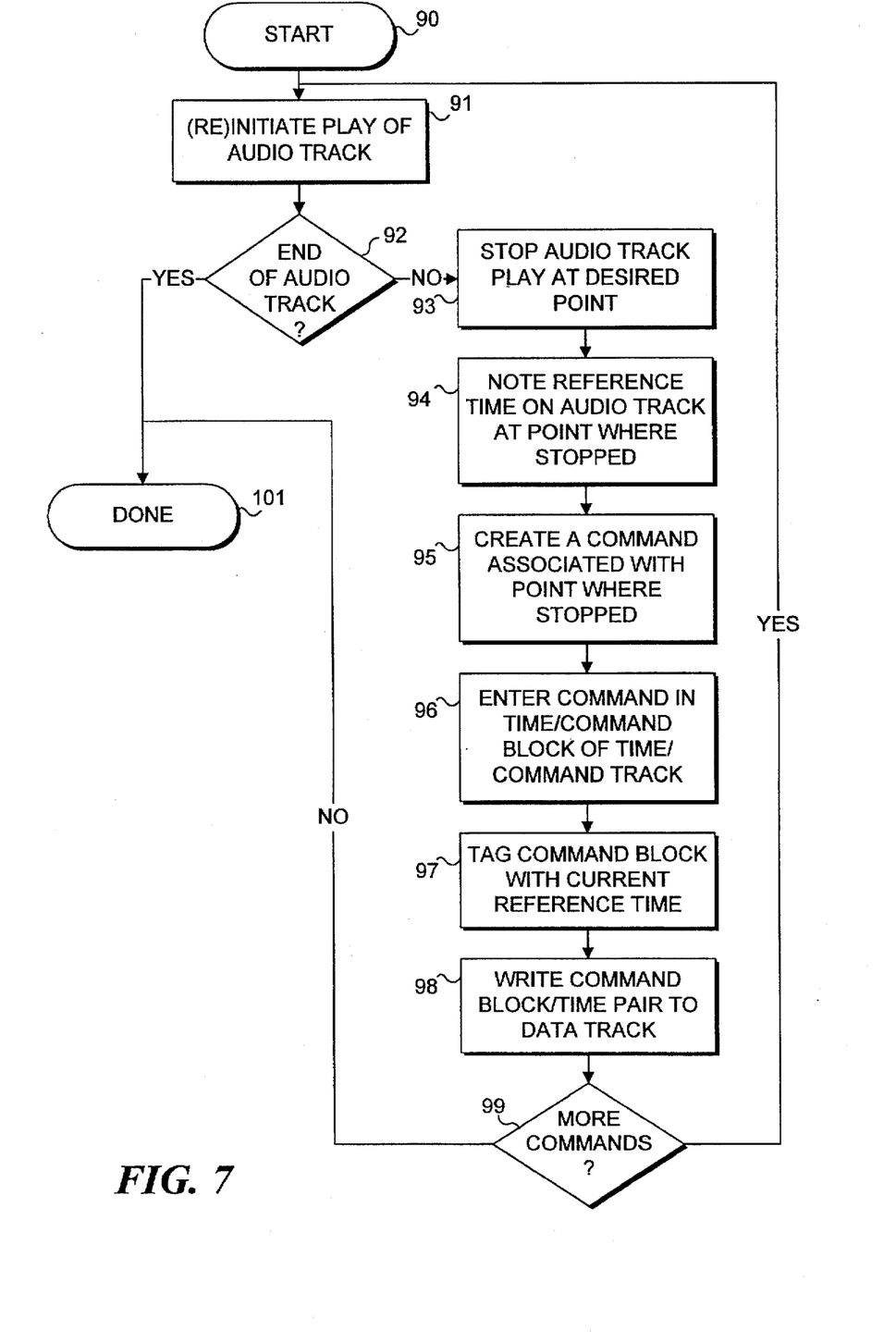
FIG. 7 is a flow chart that illustrates the logical steps for creating a time data track that is synchronized with the audio track recorded on a CD-ROM.

FIG. 7 illustrates the logical steps required to create a multimedia work in accordance with the present invention. The flow chart shown in FIG. 7, which begins at a start block 90, proceeds to a block 91, to initiate play of the audio track. Next, in a decision block 92, the CPU determines if the end of the audio track has been reached, and if so, concludes the present procedure in a block 101. Assuming that the audio track has just started or is still playing, the logic proceeds to a block 93, which provides for stopping the playback of the audio track at a desired point where a particular command is to be implemented.

In a block 94, the user notes the reference time (TMSF) for the current sector of the audio track, which is contained within the control data (block 48 shown in FIG. 3), in conformance with the Redbook standard. In a block 95, the user creates the command that is to be associated with the audio track at the current address or point where the playback of the audio has been stopped. That command is entered into a block of the time/command track, in a logic block 96. When initially creating the multimedia work, the data that will be recorded on the CD-ROM are stored on hard drive 16 (FIG. 1). Subsequently, the data comprising the multimedia work are transferred to and stored on a master CD-ROM using a conventional CD-ROM recorder (not shown). The master CD-ROM is then used to produce the CD-ROMs that will be distributed to the end users for playback of the multimedia work.

In a logic block 97, the command that has just been entered is tagged with the current reference time or TMSF that represents the physical address of the point in the audio data stream at which playback has been stopped. Thereafter, a logic block 98 provides for writing the time/command pair to the time/command data track. A decision block 99 determines if there are any more commands that are associated with playback of the current musical selection. If so, the logic returns to decision block 92 to determine if the end of the audio track has been reached for the current musical selection and if not, repeats the logical steps just described. However, if no other commands are to be associated with the current audio selection, the procedure terminates in block 101.

Figure 8:
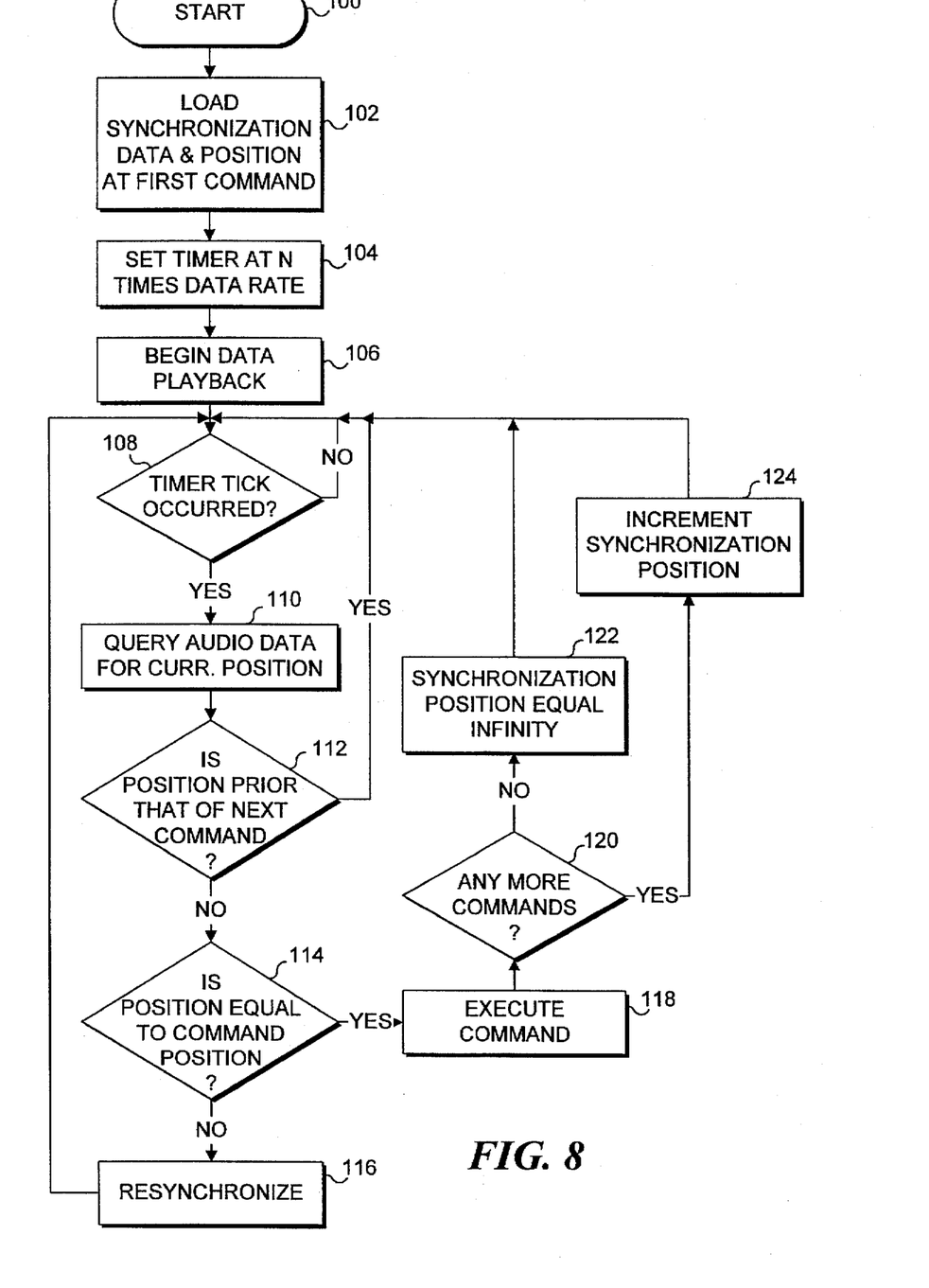
FIG. 8 is a flow chart that illustrates the steps implemented to synchronize time and command data with audio data during playback of a CD-ROM on which the data are stored.

The steps implemented by CPU 23 during playback of a multimedia work in which the time/command track has been provided to maintain synchronization with the audio track are shown in FIG. 8, beginning at a start block 100. In a block 102, the CPU loads the synchronization data from the time/command track and positions the data at the first command. In a block 104, the CPU sets synchronization timer 31 at a multiple N times the current data rate of the audio track. In the preferred embodiment, the synchronization timer is set at two times the data rate (i.e., N=2), and the audio data rate is equal to 75 frames per second.

Playback of the audio data begins in a block 106. A decision block 108 determines if a timer tick, produced by synchronization timer 31 (FIG. 2), has occurred. The timer ticks occur at a multiple of the data rate to ensure that sufficient resolution is maintained for synchronizing the audio playback with the other components of the multimedia work that are to be implemented by the commands in the time/command track. If a timer tick has not yet occurred, the logic waits for an interrupt to be generated or employs message queuing by the operating system to determine when a tick has occurred, i.e., by polling the message queue. Upon the occurrence of a timer tick, a block 110 queries the audio data for the current TMSF position, which is contained within the Redbook standard control data portion of the sector. A decision block 112 determines if the current position is prior that indicated by the TMSF in the next time/command block. If so, the audio track playback has not yet reached a point where the next command is to be implemented, and the logic returns to decision block 108.

Following a negative response to decision block 112, a decision block 114 determines if the current position within the audio data stream is equal to the TMSF position associated with the next command to be implemented in the time/command track. If so, a logic block 118 executes the current command of the time/command pair. If not, the audio playback has apparently gotten ahead of the time/command track position, requiting resynchronization. Accordingly, a logic block 116 provides for resynchronizing the time/command track with the audio track, as described below. Thereafter, the logic flow returns to decision block 108.

After the current command has been executed in logic block 118, a decision block 120 determines if any more commands remain to be executed in the time/command track, during play of the current audio track. If not, a block 122 sets the synchronization or TMSF position equal to infinity as an indicator that no more commands remain to be executed. Alternatively, assuming that additional commands remain, a logic block 124 increments the time/command track to the next command to be implemented. Thereafter, the logic also returns to decision block 108.

Figure 9:
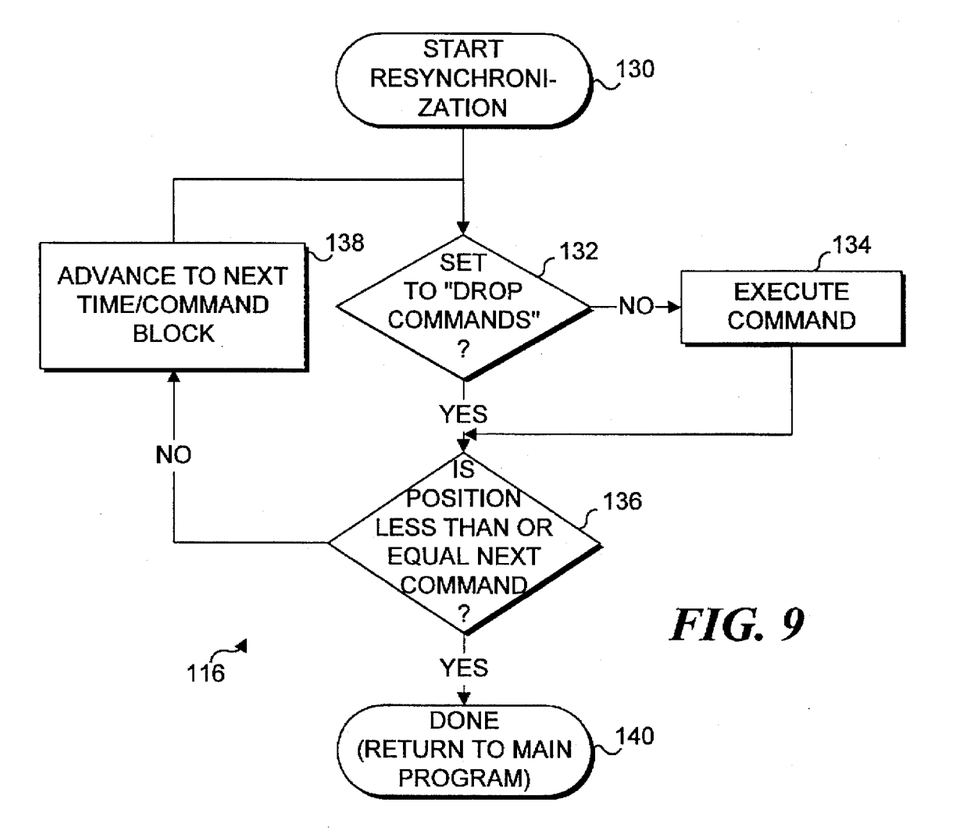
FIG. 9 is a flow chart showing the steps involved in resynchronizing the time and command data with the audio data in accord with the present invention.

Turning now to FIG. 9, details of the steps involved in resynchronizing the time/command track with the audio data are shown beginning in a block 130, which calls for starting the resynchronization process. Resynchronization is required when a command in the time/command track was not executed at the designated TMSF time during the play of the audio data. In a decision block 132, CPU 23 determines if the user has elected to resynchronize by dropping or skipping the commands that were not executed at the specified time. Alternatively, the user can elect to force all of the commands that have not been executed to execute as quickly as possible. The decision concerning which of the two techniques for resynchronization will be used is normally made by the creator of the multimedia work. However, it is also possible to allow the end user to determine which of two possible techniques will be implemented for resynchronizing. The choice can also be made on a command-by-command basis.

If playback has not been set to resynchronize by dropping commands, a logic block 134 provides for immediately executing the command that was not executed when it should have been relative to its associated TMSF address. Thereafter, or if the resynchronization is to be achieved by dropping commands, a decision block 136 determines if the current position in the audio track is less than or equal to that of the TMSF associated with the next command. If not, a block 138 provides for incrementing to the next time/command block position. Thereafter, the logic returns to implement decision block 132. However, if the response to decision block 136 indicates that the current position in the audio track is less than or equal to the TMSF address associated with the next command, the logic has completed the resynchronization, and enables a return to the main program in a block 140. In this manner, resynchronization is achieved either by immediately executing commands that have an associated address in the audio track, which is already passed by, or by dropping the commands with associated addresses that have passed by in order to catch up with the current position in the audio track. When the multimedia work is created, a dialog box is presented to the creator of the work to enable the choice of resynchronization method to be made.

Although the present invention has been described in connection with the preferred form of practicing it, those of ordinary skill in the art will understand that many modifications can be made thereto within the scope of the claims that follow. For example, while the preferred embodiment is associated with playback and synchronization of components such as video with an audio track recorded in the Redbook format, the invention can also be used for synchronizing recordings in other audio formats, and for synchronizing audio with other types of objects besides video. Accordingly, it is not intended that the scope of the invention in any way be limited by the above description, but that it be determined entirely by reference to the claims that follow.

The invention in which an exclusive right is claimed is defined by the following:

1. A method for storing a first data stream and a second data stream for synchronized playback from a storage medium, comprising the steps of:
    (a) storing the first stream of data on the storage medium;
    (b) storing the second stream of data on the storage medium, separate from the first stream of data, said second stream of data comprising timing data that specify a plurality of temporal pairs, each temporal pair comprising a command and a position in the first stream of data that is associated with the command; and
    (c) using the temporal pairs to sequence the first stream of data with the second stream of data, so that the first and the second streams of data are synchronized.

2. The method of claim 1, wherein the first stream of data defines an audio signal, and wherein the second stream of data controls at least one element of a multimedia work that is to be executed in synchronization with the audio signal.

3. The method of claim 2, wherein the storage medium comprises a compact disk, and wherein the first stream of data is formatted on the compact disk so that the first stream of data is playable on a conventional audio compact disk player, said position being specified by a track, a time, and a frame for the first data stream.

4. The method of claim 1, further comprising the step of resynchronizing the second stream of data with the first stream of data if synchronization is lost.

5. The method of claim 4, wherein the step of resynchronizing comprises the step of skipping the commands in any temporal pairs that reference previous positions in the first stream of data, where said previous positions in the first stream of data have already been executed by the computer.

6. The method of claim 4, wherein the step of resynchronizing comprises the step of immediately executing the commands in any temporal pairs that reference previous positions in the first stream of data, where said previous positions in the first stream of data have already been executed by the computer, so that said commands associated with said previous positions are immediately executed by the computer.

7. The method of claim 4, further comprising the step of enabling a user to specify one of a plurality of alternative steps to resynchronize the first and the second streams of data.

8. The method of claim 1, wherein the first stream of data comprises one of Redbook data, MIDI data, digital audio data, and WAV data.

9. The method of claim 1, further comprising the step of comparing the position in the second data stream to that in the first data stream at predefined time intervals.

10. The method of claim 9, wherein the time intervals are determined by a timer running on the computer.

11. A method for synchronizing commands that control non-audio elements of a multimedia work with a stream of audio data used in the multimedia work, comprising the steps of:

(a) storing the stream of audio data on tracks of a compact disk-read only memory (CD-ROM);

(b) storing a plurality of temporal pairs on the CD-ROM, separate from the stream of audio data, each of said temporal pairs including a command and position data referencing a position in the stream of audio data at which the command is to be executed;

(c) playing the stream of audio data stored on the CD-ROM on a computer; and (d) executing the command in a temporal pair when the position data in the temporal pair addresses a current position in the stream of the audio data that is playing, thereby synchronizing the non-audio elements controlled by the commands with the stream of audio data.

12. The method of claim 11, further comprising the step of enabling an author of the multimedia work to select one of a plurality of specified methods for resynchronizing the temporal pairs with the stream of audio data if synchronization is lost.

13. The method of claim 11, further comprising the step of resynchronizing the non-audio elements with the stream of audio data if a loss of synchronization occurs, by dropping commands associated with position data corresponding to portions of the stream of audio data that have already played on the computer.

14. The method of claim 11, further comprising the step of resynchronizing the non-audio elements with the stream of audio data if a loss of synchronization occurs, by immediately executing all commands associated with position data corresponding to portions of the stream of audio data that have already played.

15. The method of claim 11, wherein the stream of audio data stored on the CD-ROM comprises one of Redbook data, WAV data, digital audio data, and MIDI data.

16. The method of claim 15, wherein the commands of the plurality of temporal pairs control one of a video and an animation.

17. The method of claim 11, further comprising the step of comparing the position data of the temporal pairs to an actual position playing in the stream of audio data at predefined intervals of time.

18. The method of claim 17, wherein a time maintained by the computer determines the predefined intervals of time.

19. The method of claim 11, wherein the stream of audio data is stored on the CD-ROM in a format that enables it to be played on a conventional audio CD player.

20. A system for storing a first data stream and a second data stream on a storage medium so that the first and the second data streams can be synchronized when read from the storage medium, comprising:

a computer for implementing the storage of the first and the second data streams on the storage medium, said computer including:

(a) a central processing unit;

(b) a memory for storing instructions used to control the central processing unit;

(c) an interface to the storage medium, said interface handling transfer of data from the computer to the storage medium for storage therein under control of the central processing unit; and (d) means for loading machine instructions into said memory, said machine instructions causing the central processing unit to:

(i) store the first data stream on the storage medium in a defined format;

(ii) provide a plurality of temporal data pairs for said second data stream, each of said temporal data pairs including a command and position data that reference a position within said first data stream; and (iii) store the second data stream on the storage medium, separate from the first data stream, so that the first data stream is synchronized with the commands of the second data stream by using the position data, when the first and second data streams are subsequently read from the storage medium.

21. The system of claim 20, wherein the first data stream comprises audio data that are part of a multimedia work, and the commands comprising the temporal pairs of the second data stream control non-audio components of the multimedia work.

22. The system of claim 20, wherein the machine instructions in memory cause the central processor to provide a timing reference that periodically initiates a comparison of the position data in the second data stream with an actual position in the first data stream as the first data stream is read from the storage medium.

23. The system of claim 20, wherein the machine instructions in memory also cause the central processor to resynchronize the first stream of data with the commands of the temporal pairs in the second stream of data if a loss of synchronization occurs, by not processing the commands of temporal pairs that include data positions corresponding to positions in the first stream of data that have already been read from the storage medium.

24. The system of claim 20, wherein the machine instructions in memory cause the central processor to resynchronize the first stream of data with the commands of the temporal pairs in the second stream of data if a loss of synchronization occurs, by immediately executing all the commands of the temporal pairs that include data positions corresponding to positions in the first stream of data that have already been read from the storage medium.

25. The system of claim 20, wherein the machine instruction in memory cause the central processor to enable a user to select one of a plurality of predefined options for resynchronizing the first stream of data with the commands in the temporal pairs of the second stream of data.

26. The system of claim 20, wherein the first stream of data comprises one of Redbook data, WAV data, digital audio data, and MIDI data.

27. The system of claim 20, wherein the storage medium comprises a CD-ROM and wherein the first stream of data comprise audio data that are stored on the CD-ROM in a format that is playable on a conventional CD player.

28. An article of manufacture adapted to be used by a computer, comprising:

a memory medium on which are stored a plurality of machine instructions, said machine instructions being provided to store a first data stream and a second data stream, for synchronized playback from a storage medium when implemented by a computer, said machine instructions providing the following functions:

(a) storing the first stream of data on the storage medium;

(b) storing the second stream of data on the storage medium, separate from a location where the first streams of data is store, second stream of data comprising timing data that specify a plurality of temporal pairs, each temporal pair comprising:

(i) a command, and (ii) a position in the first stream of data that is associated with the command; and (c) using the temporal pairs to sequence the first stream of data with the second stream of data, so that the first and the second streams of data are synchronized.

29. The article of manufacture of claim 28, wherein the first stream of data defines an audio signal, and wherein the second stream of data controls elements of a multimedia work that are to be executed in synchronization with the audio signal.

30. The article of manufacture of claim 29, wherein the storage medium comprises a compact disk, and wherein the first stream of data is formatted on the compact disk so that the first stream of data is playable on a conventional audio compact disk player, said position being specified by a track, a time, and a frame for the first data stream.

31. The article of manufacture of claim 28, wherein the machine instructions further provide the function of resynchronizing the second stream of data with the first stream of data if synchronization is lost.

32. The article of manufacture of claim 31, wherein the machine instructions provide that commands in any temporal pairs that reference previous positions in the first stream of data are skipped if said previous positions in the first stream of data have already been executed by the computer.

33. The article of manufacture of claim 31, wherein the machine instructions provide for immediately executing the commands of any temporal pairs that reference previous positions in the first stream of data, where said previous positions in the first streams of data have already been executed, so that said commands associated with said previous positions are immediately executed.

34. The article of manufacture of claim 28, wherein the first stream of data comprises one of Redbook data, MIDI data, digital audio data, and WAV data.

35. The article of manufacture of claim 28, wherein the machine instructions provide for comparing the position in the second data stream to that in the first data stream at predefined time intervals.

* * * * *